(12) United States Patent
Alsberg

(10) Patent No.: US 11,898,765 B2
(45) Date of Patent: *Feb. 13, 2024

(54) SIMPLIFIED SYSTEM AND METHOD TO SETBACK PROGRAMMING OF THERMOSTATS

(71) Applicant: Warmboard, Inc., Aptos, CA (US)

(72) Inventor: Terry Wayne Alsberg, Capitola, CA (US)

(73) Assignee: Warmboard, Inc., Aptos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,777

(22) Filed: Oct. 25, 2022

(65) Prior Publication Data

US 2023/0039838 A1 Feb. 9, 2023

Related U.S. Application Data

(63) Continuation of application No. 17/037,334, filed on Sep. 29, 2020, now Pat. No. 11,499,737.

(60) Provisional application No. 62/908,342, filed on Sep. 30, 2019.

(51) Int. Cl.
*F24F 11/523* (2018.01)
*G06F 3/04817* (2022.01)
*G06F 3/0482* (2013.01)
*F24F 11/61* (2018.01)

(52) U.S. Cl.
CPC ............ *F24F 11/523* (2018.01); *F24F 11/61* (2018.01); *G06F 3/0482* (2013.01); *G06F 3/04817* (2013.01)

(58) Field of Classification Search
CPC ..... F24F 11/523; F24F 11/61; G06F 3/04817; G06F 3/0482
See application file for complete search history.

(56) References Cited

U.S. PATENT DOCUMENTS

| | | | |
|---|---|---|---|
| 2008/0048046 A1* | 2/2008 | Wagner | F24F 11/58 236/94 |
| 2011/0238224 A1* | 9/2011 | Schnell | G06Q 50/06 700/278 |
| 2013/0226352 A1* | 8/2013 | Dean-Hendricks | F24F 11/65 700/276 |
| 2018/0267701 A1* | 9/2018 | Rigg | G06F 3/0482 |

* cited by examiner

*Primary Examiner* — Cao H Nguyen
(74) *Attorney, Agent, or Firm* — Fenwick & West LLP

(57) ABSTRACT

A programmable thermostat usable to program their thermostat in a more intuitive manner using the fewer commands. The programmable thermostat provides a simplified level of programming that is intuitive and quick, based on a common set of settings, such as a nighttime setback programming that automatically adjusts the thermostat setpoint down in the evening and resetting the setpoint up in the morning, and a "five and two" programming reflecting the normal five-day work week and two-day weekend, as well as four events per day during the work week but only two events during the two weekend days. By compromising infinite flexibility and customization of programming for the efficiency of assuming that the most common settings are sufficient for most users, and these most common settings can be accomplished with a greatly reduced set of intuitive commands, making it easier for users to making use of thermostat programming.

15 Claims, 2 Drawing Sheets

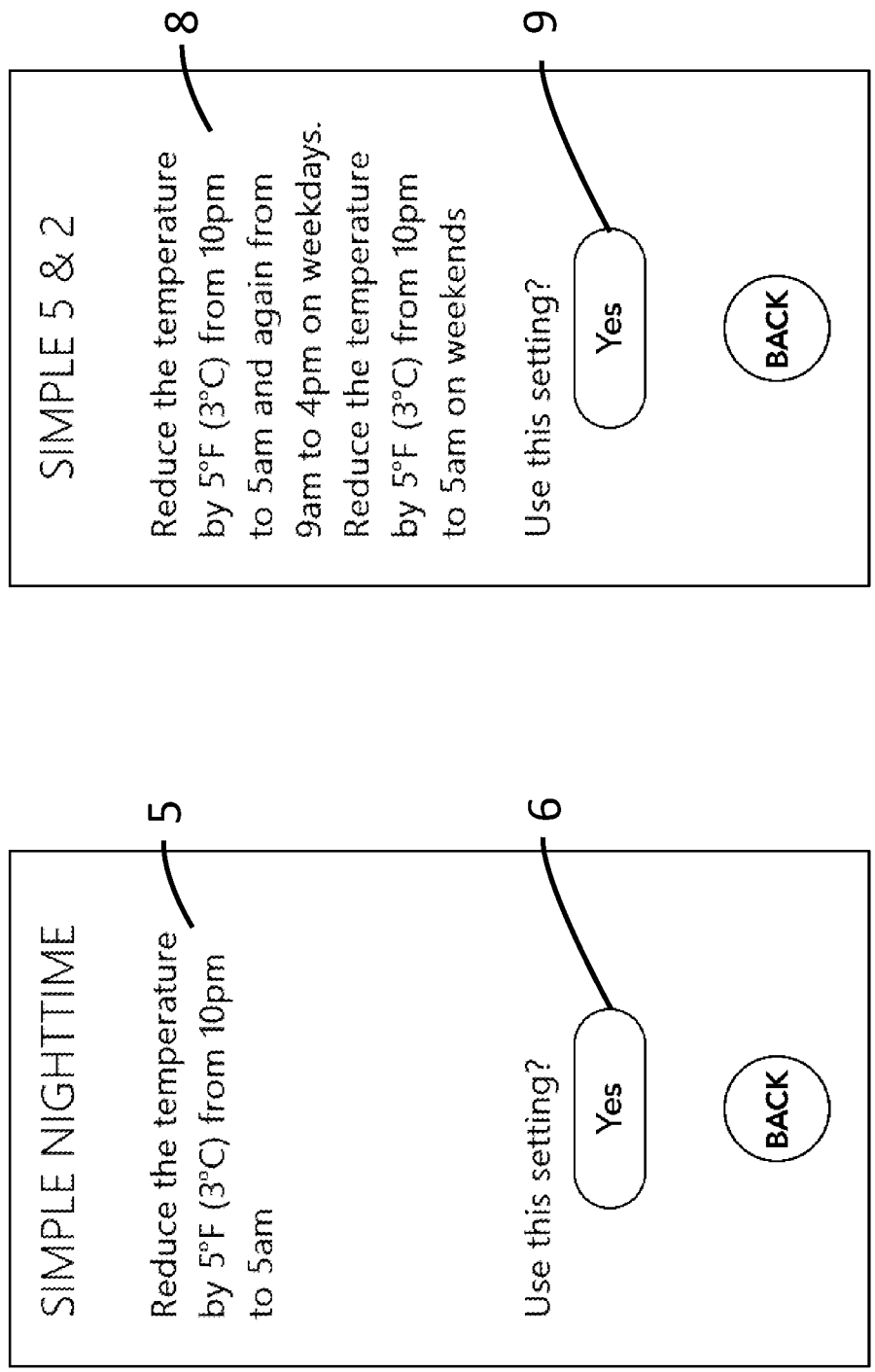

SIMPLIFIED SYSTEM AND METHOD TO SETBACK PROGRAMMING OF THERMOSTATS

CROSS-REFERENCE TO RELATED APPLICATIONS

This application is a continuation of U.S. patent application Ser. No. 17/037,334, filed on Sep. 29, 2020, which claims priority to U.S. Provisional Patent Application No. 62/908,342, filed on Sep. 30, 2019, the contents of which are hereby incorporated by reference herein in their entireties.

BACKGROUND

Modern thermostats are typically programmable. A programmable thermostat is one that can be programmed by a user such that the target temperature (setpoint) adjusts upward and/or downward at various times throughout the day and week. Many government regulatory agencies require thermostats to enable programmability, in order to enhance energy efficiency. Programming a programmable thermostat typically requires the user to enter commands by pressing a series of buttons, or touching a touch screen with virtual buttons, in a particular order according to a user manual to accomplish the desired programming. However, studies have indicated that despite the near universal installation of programmable thermostats, most are not in fact programmed because of the relatively high number of non-intuitive steps that must be followed to accomplish the programming.

Some programmable thermostats are capable of four event per day, seven-day programming. This means that a user may need to, in order to program the thermostat, enter numerous commands to set, for example, the time and temperature desired in the morning when the user wakes up, another time and temperature when they leave for work, another time and temperature when they return home from work, and yet another time and temperature for when they go to sleep. Further complicating this process is that the user may have to go through the same sequence of commands for each of seven separate days of the week. This process becomes even more tedious when multiple thermostats are employed. This process can take a considerable amount of time along with constant referral to the user manual. The inherent elaborations in part explain why so few users actually go through the process of programming their programmable thermostats.

SUMMARY

In some embodiments, a programmable thermostat is provided that is usable by the user to program their thermostat in a more intuitive manner using the fewer commands. The programmable thermostat provides a simplified level of programming that is intuitive and quick, based on a common set of settings (e.g., a most common setting used by a broad demographic of users). For most users, the benefits of programmability derive from nighttime setback, which means adjusting the thermostat setpoint down just prior to going to sleep and resetting the setpoint up just prior to waking up. The interface of the programmable thermostat discussed herein does this with minimal and intuitive commands.

In some embodiments, the programmable thermostat makes possible "five and two" programming reflecting the normal five-day work week and two-day weekend, as well as four events per day during the work week but only two events during the two weekend days. In some embodiments, this is accomplished by compromising infinite flexibility and customization of programming for the efficiency of assuming that the most common settings are sufficient for most users, and accomplishing these most common settings with a greatly reduced set of intuitive commands.

In some embodiments, a simplified thermostat user interface is provided, wherein the process for programming various heating and/or cooling settings for the change of setpoint temperature at specific times throughout the day or week (often referred to by those expert in this field of art as setback programming), is made easy and intuitive by means of a graphic display capable of displaying easily understood and easy to follow onscreen text instructions which suggest simplified programming options allowing the user to select factory set default options preset according to studies determining the most commonly desired amount of degrees of temperature set back at the most commonly desired times that said setback and return from said setback will be enabled.

In some embodiments, the user of the thermostat is directed by onscreen text or icons to a menu from which easy night time setback, sometimes referred to as two event programming, or similar title for said night time setback, can be selected, wherein upon selecting this option, the time and temperature at a certain time in the evening, sometimes referred to as a first event, is programmed, when it is desired by the user that the ambient temperature be changed or setback from the daytime temperature previously selected by the user, and in the morning, sometimes referred to as a second event, is automatically set to the original user selected daytime setpoint, without further interaction from the user, followed by a return to the home screen either by a short period of time passing or by the selection of "done" or "return" or similar final command as is typically employed by designers of such on screen interfaces.

In some embodiments, the user of the thermostat is directed by the onscreen text or icons, to a menu from which five and two setback programming, or similar title for said setback that varies depending on the day of the week, can be selected, wherein upon selecting this option the time and temperature at given times during the common work week, commonly referred to as four event programming, wherein the user might desire a change of temperature from the user determined daytime temperature setpoint when retiring at night to sleep, followed by a return the original user determined setpoint in the morning, wherein these moments of temperature setpoint change, sometimes referred to as a first and second event, are determined by studies of the most commonly desired timing and amounts of temperature change, followed later that morning when a temperature change is desired because the user is away from the home during the day, followed by a return to the user determined daytime temperature setpoint later in the day, the daytime temperature changes sometimes referred to as a third and fourth event are automatically set to factory setback defaults for time and amount of degrees of setback without further interaction from the user, wherein during what is commonly referred to as the weekend, the programming is the two event programming in which the first and second events are performed each day, but without the third and fourth events, wherein the programming process is completed by a return to the home screen either by a short period of time passing or by the selection of "done" or "return" or similar final command as is typically employed by designers of such on screen interfaces.

BRIEF DESCRIPTION OF THE DRAWINGS

FIG. 3 illustrates a details interface that may be displayed by the programmable thermostat responsive to the user selecting "Simple Nighttime" programming mode, in accordance with some embodiments.

FIG. 4 illustrates a details interface that may be displayed by the programmable thermostat responsive to the user selecting "Simple 5&2" programming mode, in accordance with some embodiments.

DETAILED DESCRIPTION

Figure 2:
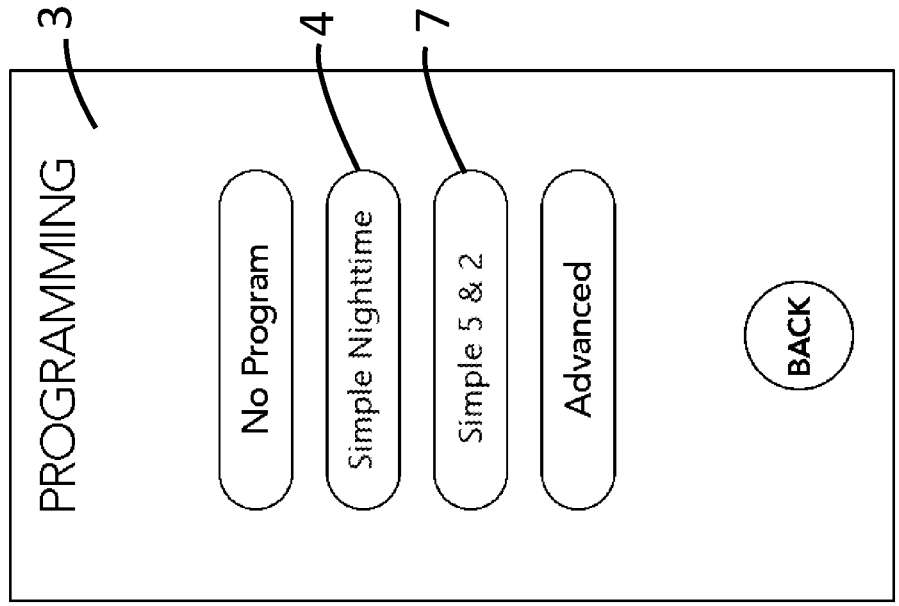
FIG. 2 illustrates the programming menu 3 that may be displayed by the programmable thermostat, in accordance with some embodiments.

Many programmable thermostats are able to be programmed by a user to execute multiple changes in target temperature setpoint (referred to as "events") per day. Embodiments described herein are directed to a thermostat having a simplified programming interface, allowing for users to more easily program the thermostat to execute multi-event programming modes without having to manually specify each event time and temperature change amount. By enabling the user to program the thermostat using a reduced set of intuitive commands, the user will find it less tedious to program the thermostat, and will be more likely to program their thermostat and increase energy efficiency of the thermostat.

Embodiments described herein may be implemented on a programmable thermostat device, such as a wall-mounted thermostat. The programmable thermostat comprises at least a controller, a display, an input interface, and a memory. In some embodiments, the input interface is implemented as part of the display (e.g., a touchscreen). The display may be configured to display to the user various information relating to settings of the thermostat and/or the conditioned area controlled by the thermostat (e.g., a current measured temperature of the conditioned area, a current temperature setpoint of the thermostat, and/or the like), as well as user interfaces allowing the user to change one or more thermostat settings (e.g., the temperature setpoint of the thermostat, programming modes of the thermostat, etc.) using the input interface.

The controller comprises one or more processors used to control operations of the thermostat. For example, the controller may receive user inputs via the input interface, such as instructions from a user to change a temperature setting or schedule of the thermostat. In response, the controller may modify one or more thermostat settings (e.g., stored in the memory), cause the display to display the updated settings, and/or issue appropriate instructions to a heat source controller for providing heat to the conditioned area.

The memory is configured to store data associated with the operation of the thermostat, and may correspond to any type of data source device, such as flash memory, SSD memory, RAM, or some combination thereof. For example, the memory may store a current temperature setpoint, a current temperature setting schedule or programming mode, one or more additional programming modes, one or more display settings for the display (e.g., color settings, background image, etc.), one or more media files (e.g., corresponding to content that can be displayed on the display), and/or the like. In some embodiments, memory may be located within the programmable thermostat. In some embodiments, the controller may further access data from a remote memory (e.g., via a wireless communication module), such as settings for preconfigured programming modes, and/or the like.

In some embodiments, a programmable thermostat is configured to facilitate user programming, by providing an interface that is intuitive for programming the thermostat to run one or more programs that will be useful to the user. In some embodiments, the programmable thermostat displays a programming menu user interface allowing the user to select between a number of preconfigured programming modes using no more than two input operations from the programming menu (e.g., a first input operation to select a programming mode, and a second input operation to confirm the user's selection). In some embodiments, the user may select between a number of preconfigured programming modes using a single input from the programming menu (e.g., a first input operation to select a programming mode, without needing a user confirmation). In addition, the programming menu may contain additional interactive elements to allow the user to further customize specific parameters of setback events (e.g., temperature, setback amount, setback time, etc.). As such, users are able to quickly program the thermostat to perform setback operation programs to achieve greater energy efficiency, while still being able to, if desired, change specific parameters of the setback operation program for more customized control.

In some embodiments, a program that is beneficial for many users is two event nighttime setback. In but one example of an interface, the thermostat comprises is a touch screen interface. A user selects "menu" from the home screen of the interface, which brings up a programming menu. From the programming menu, the user selects "simple nighttime", then selects "done" or "yes" or some similar command to enable the simple program. In this example, the two event nighttime setback mode causes the thermostat to, whatever the daytime setpoint may be, reset lower the setpoint temperature by a predetermined amount (e.g., five degrees) at a first predetermined time (e.g., ten o'clock in the evening), and at a second predetermined time (e.g., five o'clock the next morning) the setpoint is reset upwards by the predetermined amount (e.g., five degrees), returning to the original desired daytime setpoint. As such, the setpoint temperature of the area controlled by the thermostat is lowered at night, as it may be desirable for purposes of comfort and energy efficiency to have bedrooms or even a whole structure be reduced in temperature to operate at a reduced ambient air temperature setpoint at nighttime while sleeping, only to return to a more normal higher daytime setpoint when the occupants awake in the morning.

In this example, the first and second predetermined times (e.g., ten o'clock PM and five o'clock AM timing) may be preset in the thermostat by the manufacturer and both need not and/or cannot be adjusted by the user seeking the fastest and simplest programming process. The example above is but one of many possible combinations of time and temperature. In some embodiments, times selected are preset according to market studies that indicate the most common sleep patterns of the largest demographic of users. The temperature change may also be determined by market studies to ensure that it meets the desires of the largest demographic of users. In some embodiments, the times and/or temperature change may be set to different levels based upon a time of year, geographic location, and/or other factors (e.g., due to different daylight hours at different geographic locations at different times of year). For example, in some embodiments, the preset event times and/or temperature change amount, instead of being set values, may be set as a function of time of year, geographic location, and/or the like, or comprise different values mapped to different combinations of factors (e.g., using a look-up table stored in the memory of the thermostat), such that different setback times and/or temperature change amounts are used for different months of the year, without the need for manual user programming. In addition, in some embodiments, the temperature setback amount may be configured as a predetermined function of the current daytime temperature setpoint.

In some embodiments, the programmable thermostat contains an interface allowing for users to program the thermostat for "five and two, four event" programming, using similar simplified commands. The user selects a Programming menu on the thermostat interface, and from the programming menu the "simple five & two" program is selected, followed by selecting "done" or "yes" or some similar command. In this example, for the five weekdays (Monday through Friday), the desired user daytime set point is reset four times throughout the day. In some embodiments, the four events may be as follows: reset down by a first amount (e.g., five degrees) at a first time (e.g., ten o'clock at night), back upwards by the first amount (e.g., five degrees) at a second time (e.g., five o'clock the next morning), back down by the first amount (e.g., five degrees) at a third time (e.g., nine o'clock that morning), and a return to the original desired daytime setpoint (e.g., back upwards by the first amount) at a fourth time (e.g., four o'clock in the afternoon). This cycle is repeated Monday through Friday. On the two weekend days, Saturday and Sunday, there are only two events, morning up and evening down, essentially like the simplified nighttime programming discussed above. This programming mode can thus be beneficial for saving energy by lowering the setpoint temperature of a room or structure during daytime on weekdays when occupants are expected to be at work, but maintain a higher daytime setpoint temperature during weekends when occupants are more likely to be home during the day. As with the "Simple Nighttime" programming mode described above, the actual event times and reset temperatures are preset according to market studies to meet to ensure that they meet the desires of the largest demographic of users. In addition, similar to above, the event times and temperature change amounts may, in some embodiments, correspond to different values based on factors such as time of year, geographic location, etc.

While the user interface in the examples above is described as a touch screen, other interfaces such as mechanical buttons, or a smart cellphone, or other commonly utilized interfaces may be employed. In some embodiments, the thermostat may implement a voice-controlled interface configured to receive voice commands from the user as user inputs, and comprise a speaker configured to provide audio confirmation or feedback in response to user inputs.

Figure 1:
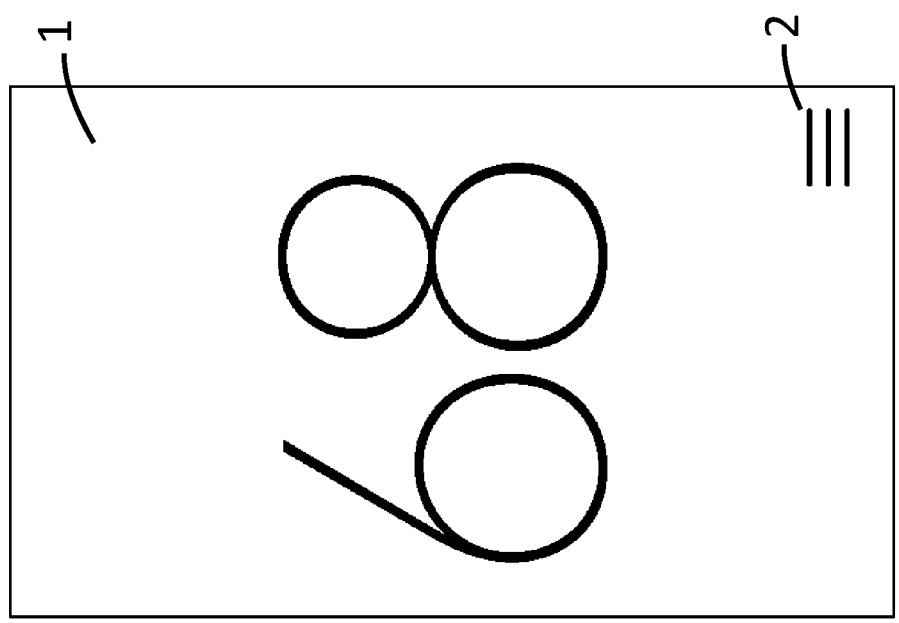
FIG. 1 illustrates the programmable thermostat, which provides an interface depicting a home screen, in accordance with some embodiments.

FIGS. 1-4 illustrate a programmable thermostat, in accordance with some embodiments. The programmable thermostat illustrated in FIGS. 1-4 includes a touch screen interface, although it is understood that in other embodiments, other types of interfaces may be used. FIG. 1 illustrates the programmable thermostat, which provides an interface depicting a home screen 1, in accordance with some embodiments. The home screen 1 may display an indication of a current setpoint temperature of the thermostat (shown in FIG. 1 as 68°). In some embodiments, the home screen 1 may further display one or more additional interface elements (not shown) usable by the user to change the current setpoint temperature (e.g., arrow keys or icons).

The home screen 1 further contains a menu icon 2, which if touched by the user, causes the interface to display a programming menu 3. FIG. 2 illustrates the programming menu 3 that may be displayed by the programmable thermostat, in accordance with some embodiments. The programming menu 3, as depicted in FIG. 2, displays selectable interface elements (e.g., buttons) corresponding to several possible programming options. For example, in response to the user pressing the button labelled "No Program", the thermostat may be configured to reset from any previous programming mode, and simply maintain the temperature indicated by the setpoint temperature at the home screen 1.

The programming menu 3 may further display "Simple Nighttime" button 4 may bring up an example of a details screen with possible text 5, depicted in FIG. 3, detailing the program settings of the simple nighttime program, and a "yes" button 6. Pressing the "yes" button completes the programming and takes the user back to the home screen 1. The thermostat will subsequently operate using the simple nighttime setback programming mode, with two events per day including a first event (also referred to as a "setback event") at a predetermined evening time in which the temperature setpoint is setback (e.g., reduced) from a current daytime temperature setpoint (e.g., 68° as shown in FIG. 1) by a predetermined amount, and a second event (also referred to as a "return event") at a predetermined morning time in which the temperature setpoint is returned to the daytime temperature setpoint. In some embodiments, while the event times and temperature change amounts of the simple nighttime setback programming mode are preconfigured, the user retains control of the overall temperature of the conditioned area as the temperature adjustments made during each event are based on the current daytime temperature setpoint of the thermostat (e.g., set by the user using home screen 1 of FIG. 1).

As such, the user can implement simple nighttime programming for their thermostat through no more than two user inputs from the programming menu 2 (e.g., pressing the "Simple Nighttime" button 4 to select the programming mode, and pressing the confirmation button 6 to confirm their selection), or no more than three user inputs from the initial home screen shown in FIG. 1. In some embodiments, the user may be able to set the thermostat to simple nighttime programming with a single input from the programming menu. For example, in some embodiments, the thermostat, responsive to the user selecting the "Simple Nighttime" button 4, automatically programs the thermostat to execute the nighttime setback program corresponding to "Simple Nighttime" without any additional user inputs. In addition, the thermostat may display a details interface similar to that of FIG. 3, which returns to the home screen 1 after a predetermined time period of non-interaction by the user or by user selection of the confirmation button. In other embodiments, the details interface may further display a cancellation button allowing for the user to cancel the programming.

On the other hand, if from the programming menu (shown in FIG. 2), the user presses the button labelled "Simple 5&2" 7, the interface displays a different screen depicted in FIG. 4, with text 8 detailing the simple 5&2 program settings. Pressing the confirmation button 9 completes the programming and returns the user to the home screen 1. The thermostat will subsequently operate using the simple 5&2 setback programming mode, wherein the thermostat is programmed to execute two events per day on each weekend day (similar to simple nighttime discussed above), and four events per day each weekday day, including the first and second events described above, as well as a third event at a second predetermined morning time after the second event in which the temperature setpoint is setback from the daytime temperature setpoint by the predetermined amount, and a fourth event at a second evening time before the first event in which the temperature setpoint is returned to the daytime temperature setpoint. In some embodiments, the temperature change amount associated with the first and second events may be the same as that of the third and fourth events, or may be configured to be different. In some embodiments, while the event times and temperature change amounts of the simple nighttime setback programming mode may be preconfigured, the user retains control of the overall temperature of the conditioned area as the temperature adjustments made during each event are based on the current daytime temperature setpoint of the thermostat (e.g., set by the user using home screen 1 of FIG. 1).

As such, similar to as discussed above with relation to the simple nighttime programming mode, the user can implement simple 5&2 programming for their thermostat through no more than two user inputs from the programming menu 2 (or no more than three user inputs from the initial home screen shown in FIG. 1). In addition, in some embodiments, the user may be able to set the thermostat to simple 5&2 programming with a single input from the programming menu, similar to as discussed above.

If the user presses the button labelled "Advanced", the interface may display an advanced programming screen containing interface elements allowing the user to manually specify event times and corresponding temperature adjustment amounts for one or more days of the week (e.g., each day programming individually, 5&2 programming, nighttime setback programming, etc.). In some embodiments, the user, through the advanced programming screen, may specify specific event times and/or temperature change amounts to be used in place of predetermined parameters of the simplified nighttime and/or simplified 5&2 programming modes discussed above. In some embodiments, the user may specify parameters for additional programming modes, which may be saved in a memory and later used to program the thermostat. For example, after the user saves a new programming mode using the advanced programming screen, the programming menu (e.g., as shown in FIG. 2) may display a new button corresponding to the new programming mode which the user can select to have the thermostat implement the selected programming mode.

As above description demonstrates, as few as three simple and intuitive steps completes programming. While the figures illustrate certain types interface elements, it is understood that those skilled in the design of interfaces may use different button labels or text and may include other options which are more complex as is typical in traditional thermostats, which are nonetheless still within the scope and spirit of the present invention.

In addition, although the above discussion primarily refers to the user performing inputs by touching buttons displayed on the display of the thermostat, it is understood that in other embodiments, other input methods may be used. For example, in some embodiments, the user may use physical buttons (located on the thermostat or on a separate device in communication with the thermostat) to provide user inputs (e.g., select an option displayed on the thermostat display). In some embodiments, the thermostat may comprise an audio sensor configured to receive voice commands by the user, allowing the user to perform a user input through speech (e.g., by saying out loud a desired programming option) in lieu of interacting with the interface through touch. In addition, the thermostat may comprise a speaker configured to provide voice feedback to the user (e.g., to confirm receipt of a user input, to request the user to confirm their programming selection, etc.).

In some embodiments, the thermostat may be part of a heating system for providing heat to multiple conditioned zones. For example, the heating system may comprise a thermostat for each of a plurality of zones (e.g., corresponding to different rooms of a building), where the user may be able to program the thermostat for each zone independently. In some embodiments, each thermostat comprises a transceiver configured to allow for communication between different thermostats of the heating system, allowing for a programming option selected by the user at one thermostat to be transmitted to and applied at a thermostat of another zone. In some embodiments, in systems with multiple conditioned zones, the user programming a thermostat corresponding to a specific zone may, upon selecting a programming option (e.g., a preset program such as "Simple Nighttime" or "Simple 5&2" as described above, or a user-customized program set using the advanced programming menu), may be presented with an option to apply the program to the current zone, or to all zones of the plurality of conditioned zones. This option will obviate the need for the user program each and every zone one by one, but instead by selecting 'apply to all' it means that all thermostats in the home will follow the same program (e.g., nighttime setback, 5&2 setback, or even advanced setback programming) to every zone in the home. In some embodiments, the thermostat displays an "Apply to Current Zone" option and an "Apply to All Zones" options in lieu of a confirmation option (e.g., the "Yes" button 6 and 9 of FIG. 3 and FIG. 4), allowing the user to determine whether their selected program applies to only the current zone or to all zones without increasing the number of user inputs required. In other embodiments, the thermostat may further display a confirmation button for the user to confirm their selection after the user has selected between applying the program to the current zone only or to all zones (such that the user selecting between applying the program to the current zone only or to all zones is performed through an additional input step). When the user applies a setback programming option to all zones, information corresponding to the selected option is transmitted by the thermostat to other thermostats of the heating system. In some embodiments, the setback programming is performed for each zone based on the current daytime temperature set on the respective thermostat for that zone, allowing for different zones to have different daytime and setback temperatures even though the same programming option is applied to all zones. In other embodiments, when the user applies a setback programming option to all zones, the daytime temperatures of each of the other zones are set to the temperature indicated by the thermostat being programmed by the user. In addition, it is understood that although options to set the programming for only the current zone or to all zones is described herein, other embodiments may include options for the user to apply the programming option to a certain subset of zones (e.g., zones on a particular floor, zones associated with a user permission, etc.).

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A thermostat comprising:
   a controller;
   a display configured to:
      display a first user interface comprising one or more interface elements selectable by a user to set a first temperature, and
      display a thermostat programming interface comprising a plurality of selectable interface elements corresponding to a respective plurality of preset thermostat setback programming options, wherein each of the plurality of preset thermostat programming options corresponds to a different predetermined combination of setback and return times that define at least a respective first time period during which the temperature setpoint of the thermostat is set to the first temperature and a respective second time period during which the temperature setpoint of the thermostat is set to a temperature adjusted from the first temperature adjust;
   wherein the controller is configured to program automated setback operations of the thermostat based upon a preset thermostat setback programming option of the plurality of respective preset thermostat setback programming options corresponding to a selectable interface element of the plurality of selectable interface elements selected by the user using the displayed thermostat programming interface.

2. The thermostat of claim 1, wherein an amount of adjustment from the first temperature during the second time period is a predetermined amount.

3. The thermostat of claim 2, wherein the predetermined amount is set based upon at least one of a time of year, a geographic location, and the first temperature.

4. The thermostat of claim 1, wherein the first temperature corresponds to a daytime temperature.

5. The thermostat of claim 1, wherein the first temperature corresponds to a current thermostat temperature setpoint.

6. The thermostat of claim 1, wherein the setback and return times corresponding to a preset thermostat programming option of the plurality of preset thermostat programming options are determined by a predetermined function based on a current time of year.

7. The thermostat of claim 1, wherein the plurality of selectable interface elements corresponding to the plurality preset thermostat setback programming options comprises at least:
   a first selectable interface element corresponding to a first setback programming option of the plurality of preset thermostat programming options configured to cause the controller to program the thermostat to execute, per day:
      a first event at a predetermined evening time to setback an ambient temperature of the thermostat from the first temperature by a predetermined amount, and
      a second event at a predetermined morning time to return the thermostat to the first temperature.

8. The thermostat of claim 7, wherein the plurality of selectable interface elements corresponding to the plurality preset thermostat setback programming options further comprises:
   a second selectable interface element corresponding to a second setback programming option of the plurality of preset thermostat programming options configured to cause the controller to program the thermostat to execute:
      four event programming during each weekday day, comprising:
         the first event;
         the second event;
         a third event at a second predetermined morning time after the predetermined morning time to setback the ambient temperature of the thermostat from the first temperature by the predetermined amount; and
         a fourth event at a second predetermined evening time before the predetermined evening time to return the thermostat to the first temperature; and
      two event programming during each weekend day, where only the first and second events are executed, without the third and fourth events;
   wherein the user is able to select the first setback programming option or the second setback programming option through a single input on the thermostat programming interface of the thermostat programming screen by selecting the first selectable interface element or the second selectable interface element.

9. The thermostat of claim 1, wherein
   the first user interface further comprises an additional element selectable by the user to cause the display to display the thermostat programming interface.

10. The thermostat of claim 1, wherein the display is a touchscreen.

11. The thermostat of claim 1, further comprising an audio sensor configured to receive a user voice command selecting the preset thermostat setback programming option of the plurality of preset thermostat setback programming options corresponding to the plurality of selectable interface elements.

12. The thermostat of claim 1, wherein the thermostat controls a temperature of a conditioned zone of a plurality of conditioned zones, and wherein the controller is further configured to receive a user selection indicating whether to apply the selected thermostat setback programming option to only the conditioned zone controlled by the thermostat or to each conditioned zone of the plurality of conditioned zones.

13. The thermostat of claim 12, further comprising a transceiver configured to, responsive to the controller receiving a user selection indicating to apply the selected thermostat setback programming option to each conditioned zone of the plurality of conditioned zones, transmit information indicating the selected thermostat setback programming option to one or more other thermostats corresponding to remaining conditioned zones of the plurality of conditioned zones.

14. The thermostat of claim 1, wherein the thermostat is configured to, responsive to receiving a user selection to apply the selected thermostat setback programming option to each of the plurality of conditioned zones, cause a temperature of each zone of the plurality of conditioned zones to be adjusted in accordance with the predetermined combination of setback and return times of the selected thermostat setback programming option based upon a respective previously-set first temperature for each zone.

15. The thermostat of claim 1, wherein the display is configured to return to a home interface following user selection of the selectable interface element of the plurality of selectable interface elements.

\* \* \* \* \*